No. 790,473. PATENTED MAY 23, 1905.
B. H. ZIMMERMAN & R. HUGHES, Jr.
CUTTER ATTACHMENT FOR SEWING MACHINES.
APPLICATION FILED JULY 31, 1902.
3 SHEETS—SHEET 1.
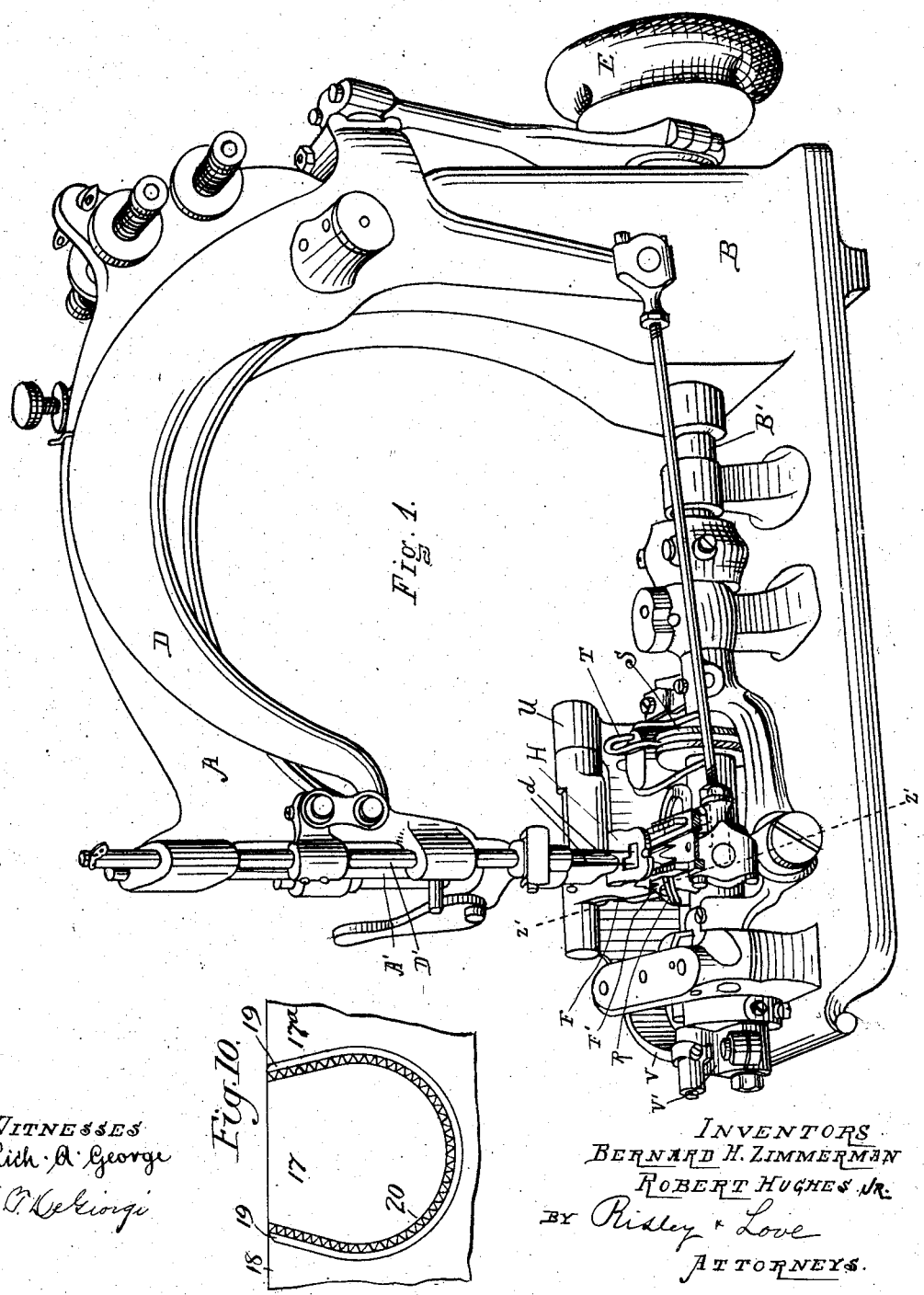

No. 790,473. PATENTED MAY 23, 1905.
B. H. ZIMMERMAN & R. HUGHES, Jr.
CUTTER ATTACHMENT FOR SEWING MACHINES.
APPLICATION FILED JULY 31, 1902.
3 SHEETS—SHEET 2.
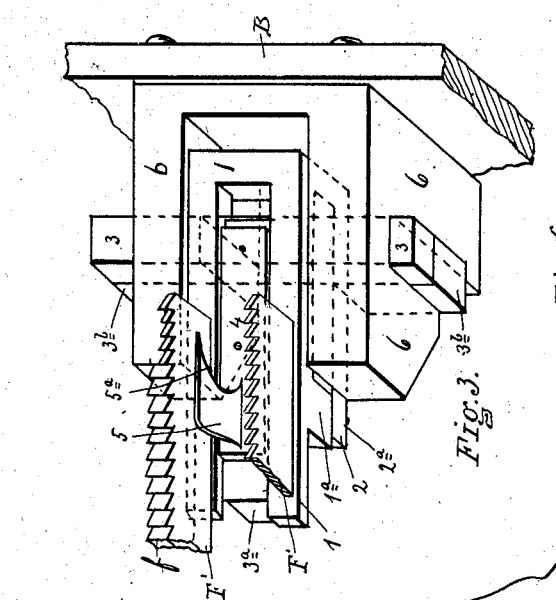
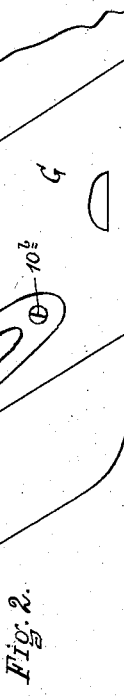
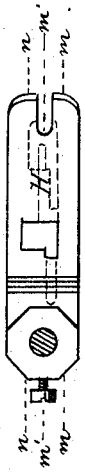
WITNESSES.
Rich. A. George
E. P. DeGiorgi
INVENTORS
BERNARD H. ZIMMERMAN
ROBERT HUGHES, JR.
By Risley & Love
ATTORNEYS.

No. 790,473. PATENTED MAY 23, 1905.
B. H. ZIMMERMAN & R. HUGHES, Jr.
CUTTER ATTACHMENT FOR SEWING MACHINES.
APPLICATION FILED JULY 31, 1902.
3 SHEETS—SHEET 3.
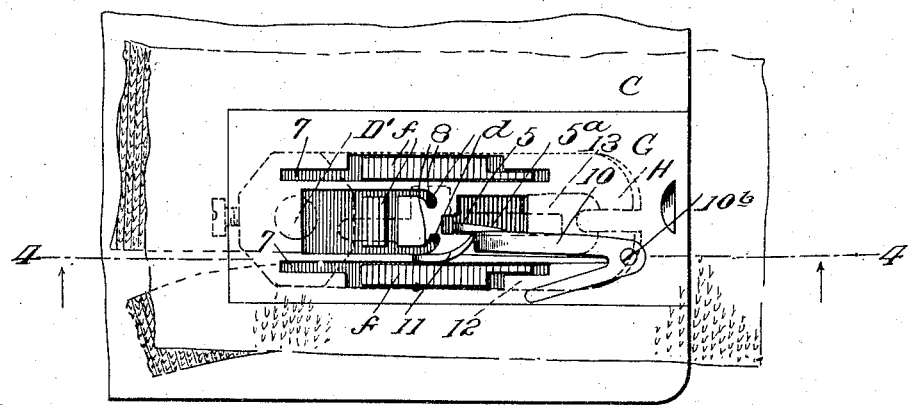
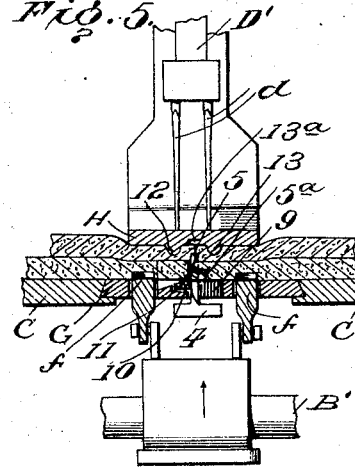
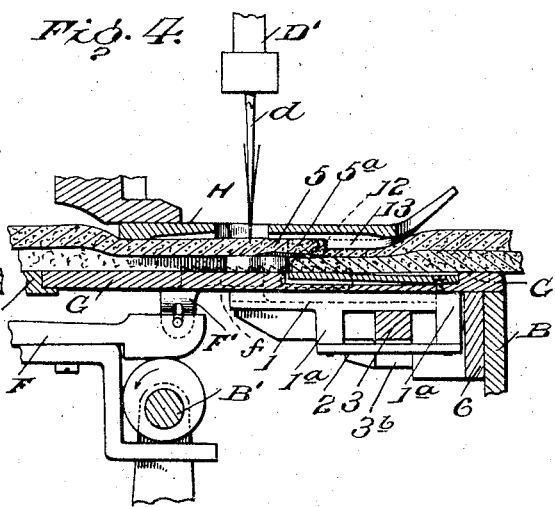
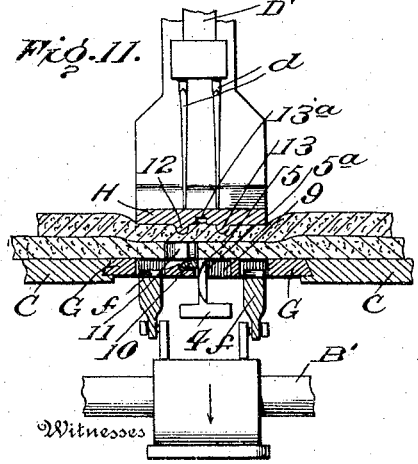
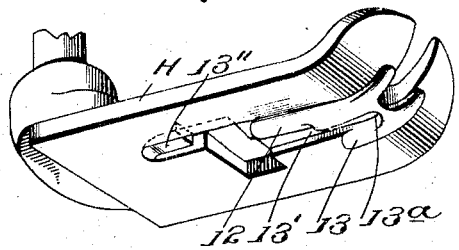
Inventors
Bernard H. Zimmerman,
Robert Hughes Jr.
By Risley & Love
Attorneys
Witnesses No. 790,473. Patented May 23, 1905.

UNITED STATES PATENT OFFICE.

BERNARD H. ZIMMERMAN AND ROBERT HUGHES, JR., OF UTICA, NEW YORK, ASSIGNORS, BY DIRECT AND MESNE ASSIGNMENTS, TO ZIMMERMAN-ROCK MACHINERY COMPANY, OF UTICA, NEW YORK, A CORPORATION OF NEW YORK.

CUTTER ATTACHMENT FOR SEWING-MACHINES.

SPECIFICATION forming part of Letters Patent No. 790,473, dated May 23, 1905.

Application filed July 31, 1902. Serial No. 117,899.

*To all whom it may concern:*

Be it known that we, BERNARD H. ZIMMERMAN, a citizen of the United States, and ROBERT HUGHES, Jr., a subject of the King of Great Britain, each residing at Utica, in the county of Oneida and State of New York, have invented certain new and useful Improvements in Cutter Attachments for Sewing-Machines, of which the following is a specification, reference being had therein to the accompanying drawings.

Our invention relates to an improvement in sewing-machines, and we do declare that the following is a full, clear, concise, and exact description thereof sufficient to enable one skilled in the art to make and use the same, reference being had to the accompanying drawings, in which like letters and numerals refer to like parts throughout.

In the manufacture of certain classes of underwear the knitted fabric is turned to provide the front and the back portions, the line on which it is turned being the shoulder-line of the garment when completed. When the material is turned, it becomes necessary to make an opening for the neck, and this is done by cutting out of the front portion a sufficiently large piece to leave a proper neck-opening. This piece is stitched onto the back portion of the garment, providing additional protection to the upper part of the back between the shoulder-blades. This piece is not cut entirely loose, but is left with its original attachment to the rear part on the line of the fold. Heretofore it has been necessary in doing this work, first to stamp in some way the line to be followed in cutting the outline of this piece. Next a line of single stitching has been taken just inside of the line marked, which operation secured to the back part the piece which was to be separated from the front part. After this it was necessary for an operator by hand to cut the front portion of the garment so as to detach the flap which was already stitched to the back portion. After this had been done it was necessary to put the article through a machine, which would put a zigzag or other wide stitch over the exposed edge of the flap, so as to give a neat finish to the garment and complete it in that particular.

The purpose of our invention is to do away with the hand operation of cutting about the part to be loosened from the front of the garment, and our device is shown as applied to a double-needle machine, which will do the wide stitching to cover the exposed edge of the flap.

By the use of our device the entire hand operation is done away with and the cutting is done at the same operation which does the stitching. In other words, we have practically done away with the single stitching and with the separate operation of cutting.

Our invention provides mechanism by which when the line of the fold of the cloth is fed into the machine the fold is pierced by the knife and one or more plies are separated and cut, all automatically, on a line parallel to the line of the stitching.

We do not limit ourselves to the specific forms and arrangements and means illustrated, as modifications can be made within the scope and spirit of our invention.

Figure 1 of the drawings is a perspective view of a sewing-machine of familiar construction with the work-plate and throat-plate removed and showing by the dotted lines near the feed-teeth the location of the box in which the cutting member is mounted and also the plate which carries the cutting member, as well as the blade itself. Fig. 2 is a perspective view of the throat-plate, showing parts of our invention and their location relatively to the feed-teeth and the needle-holes. Fig. 3 is a perspective view showing a method of mounting our invention, showing in part the sections of the feed-teeth, the plate or bar which carries the moving blade, and the fixed guides for limiting the horizontal movement of the blade. Fig. 4 is a longitudinal sectional view showing parts of the feed-operating mechanism, of the throat-plate, and of the presser-foot, together with the diverting means on the throat-plate, and the upper cutting member, together with the mounting of the latter, the said view being taken on the line 4 4 of Fig. 10ª. Fig. 5 is a vertical cross-section view showing the location of the feed-teeth and their operating mechanism, of the throat-plate and the presser-foot, and of the cutting mechanism. Fig. 6 is a top view of the presser-foot, showing in dotted lines the ridges and grooves in the lower face, which are more particularly shown in Figs. 7, 8, and 9, which are sectional views on the lines $m\,m$, $m'\,m'$, and $n\,n$ of Fig. 6. Fig. 10 illustrates the work which our invention is constructed to perform, showing the line of overstitching covering one cut edge and the other cut edge just without the line of the overstitching. Fig. 10ª is a plan view of a portion of the machine, showing the work-plate, the throat-plate, the position of the presser-foot, and the parts of the device which form part of the throat-plate and parts operating therethrough, including the feed-teeth, the diverting strip, and the upper cutting member and the shear edge which coöperates with it, and also showing material being fed to the device, one edge of the lower ply of which is being diverted from the stitching mechanism. Fig. 11 is a vertical sectional view showing the presser-foot down and the feed-teeth lowered for their forward movement. Fig. 12 is a perspective view of the under side of the presser-foot.

Our device is shown as applied to a double-needle machine of the ordinary pattern, and we do not show in detail the usual parts of such a machine, as they are well known and will be understood in connection with the drawings.

Referring, however, to the drawings in detail, we have shown at A the gooseneck of a machine, which terminates in or carries the ordinary presser-foot rod A', together with the customary attachments for elevating the same and performing the usual functions. The gooseneck rests upon the base B.

C is the work-plate.

D is the needle-arm, of usual construction, carrying the needle-bar D', which in turn carries the needles $d$. The needle-arm D is operated, through the power-pulley E, by ordinary connections, and from this also is operated the different parts of the machine.

B' illustrates the main shaft of the machine, which operates the stitch-forming mechanism, which comprises the looper R, the take-up S, and the throw-off T, which are of ordinary construction and function.

U shows an ordinary oscillating head, which receives to-and-fro motion by the connection V therefrom to the eccentric-bearing V' on shaft B'. These parts are also well known in the art. The oscillating head pivotally supports feed-lever F, which receives vertical movement through its bearing on an eccentric on shaft B', as illustrated in Fig. 4. The feed-lever F has reciprocal movement to and fro and up and down and carries the feed-arm F', which is provided with feed-teeth $f$.

G is the throat-plate, and H is a presser-foot, both of which, however, we give a particular form. The presser-foot is secured to the presser-foot rod A'.

The parts thus far pointed out are of the usual construction, except as stated.

To illustrate our invention, we show the following parts and their operation.

To the forward end of the feed-arm F', and shown in the drawings as attached to the feed-teeth, we provide a forwardly-extending box or frame, which is made up of the top portion 1, provided with a front and rear space, so that part 4 may slide freely front and back between the feed-teeth. It has downwardly-extending lugs 1ª, to which is screwed by 2ª the bottom part 2 of the box or frame. The opening thus formed is provided to receive the transverse bar 3, which is held in the box by the downwardly-extending parts 3ᵇ, fastened thereon. This transverse bar has fastened to its upper surface the cross-arm 3ª and which supports the knife-plate 4, which in turn carries the knife or blade 5. It will be seen that the blade is thus carried up and down by the feed-teeth. In order that it shall not also be carried by them to and fro, we provide a guide-block 6, which is secured to the fixed parts of the machine and in which we provide vertical grooves or slots in which the ends of the transverse bar 3 travel up and down, thereby preventing the blade from to-and-fro movement with the feed-teeth. The form of the knife is such that it extends in a blade or shank vertically, with a projecting point 5ª toward the operator. This knife has the point 5ª sharpened, so as to pierce the fold of material fed to it preparatory to cutting one or more of the layers with the cutting edge of the knife. The knife has the edge sharpened for such cutting from the point and along the curved line, so that it is not only a cutting edge, but a piercing and separating blade. Block 6, which is secured to the frame or work plate, is cut away so as to furnish a front and rear track or casing for the extended feed-arm and box 1 and also is cut away to provide guides for the transverse arm 3 to travel up and down, so that the arm 3 and the blade 5 will follow the vertical, but not the horizontal, movement of the feed-arm. By this construction we have arranged it so that the knife 5 travels up and down with the feed-teeth. It will be seen that the point of the knife is a trifle above the top surface of the feed-teeth and in proper location to pierce the fold of the cloth which is fed to the machine between the throat-plate and the presser-foot. The result of this arrangement is that as the machine operates and the feed-teeth move from the front to the rear they draw the cloth onto the knife. At first this pierces the cloth with the point of the blade, which, as the cloth passes, separates the folds and cuts those that are fed under the cutting edge of the knife.

Referring now to Fig. 2, which shows the throat-plate G, we show the position of the knife 5 and we show the feed-teeth $f$, which operate in the openings 7. 8 shows openings for the needles. 9 is the opening through which the knife passes up and down. On the plate we securely attach a shear-strip 10, which has an abrupt edge $10^a$, against which the cutting edge of the blade plays to sever material fed between the blade and the strip. The throat-plate is cut out to give necessary room for the strip, which is secured at $10^b$ and is made with a spring, so that the edge $10^a$ is kept in close contact with the cutting edge of knife 5, which passes up and down, cutting the fabric fed therebetween.

The work is fed to the machine with the ply which is to be cut below the other ply. In order that the edge of the under ply, which is not to be stitched to the back of the garment or the other ply, may be turned from contact with the needles, we provide a curved ridge or guide 11, which is located just beyond the shank of the knife and has a curved outline, so that the cloth is turned away from and out of the line of the stitching. This ridge extends from a point between the needles, or at one side of the needle in a single-needle machine, and in either case forward of the same, from which point it extends rearwardly and on one side of the needles to a point behind the same. Upon the lower face of the presser-foot we provide two ridges, one of them, 12, extending toward the rear and which presses the cloth down between the feed-teeth on the one side and the knife on the other and holds the cut ply down, so to be diverted by the ridge 11, and the other of which, 13, presses the cloth between the knife and the other line of the feed-teeth, but is not extended so far to the rear, in order that the upper ply may not be crowded so closely upon the lower one as to interfere with the passage of the knife between the two. Between the forward ends of these ridges is provided a slight groove $13^a$, which is cut out of the elevated portion of the presser-foot which forms the ridges and is provided for the free passage of the cloth to the knife. The lower face of the presser-foot is also cut before and behind the needle-hole 14, as shown by $13'$ and $13''$, further to facilitate the passage of the work to and from the knife and the needles.

In Fig. 10, 17 represents the flap which is cut from the front part of the garment and secured to the rear portion, leaving $17^a$, the body of the front portion. 18 is the line of fold between the front and the rear portions. 19 represents the point at which the cutter enters the fold, while 20 indicates the zigzag or cross stitching that is put on during the same operation.

Our invention may be applied to any style of machine by the employment of ordinary mechanical devices, it being designed to provide means whereby the folded edge of material may be pierced and one or more plies cut, and we claim particular merit in accomplishing automatically the work which has heretofore been a tedious and costly hand operation. We therefore do not limit ourselves to the forms illustrated, desiring merely to show how the parts may be applied to well-known forms of machines.

What we claim as new, and desire to secure by Letters Patent, is—

1. In a sewing-machine, a feed-arm provided with a horizontal guide or box, a blade provided with a piercing-point and a cutting edge carried vertically in the horizontal guide in the feed-arm, an oppositely-disposed cooperating shear-strip, a guide-block fixedly seated on the machine provided with grooves to engage portions of the blade-support and limit the horizontal movement of the same, in combination, substantially as set forth.

2. In a sewing-machine, a feeding mechanism, a cutting member supporting a blade provided with a piercing-point and a cutting edge adapted to pierce the fold of material fed thereto and to cut certain portions thereof, a feed-arm supporting the cutting member and imparting vertical motion thereto, a groove provided in the feed-arm to permit horizontal play of the latter relatively to the cutting member, a fixed guide-block provided with transversely-vertical slots wherein the cutting member is engaged and whereby horizontal movement of the same is prevented, a shear-strip opposed to the edge of the cutting member, in combination, substantially as described.

3. In a sewing-machine, a feed-arm provided with feed-teeth, a horizontally-extending blade provided with a piercing-point mounted adjacent to the feed-teeth and supported therewith in a horizontally-extended bearing, a horizontally-extended bearing adjacent to the feed-teeth, a fixed guide-block provided with vertical slots therein, arms secured to the blade adapted to move vertically in said slots whereby the blade is moved vertically by the feed-teeth in a plane fixed by the slots in the guide-block, a member coöperating with the blade in cutting interfed material, in combination, substantially as set forth.

4. In a two-needle sewing-machine, a feed-arm provided with feed-teeth, a blade having a piercing-point and a cutting edge mounted adjacent to the feed-teeth and between the work-line of the needles and connected with the feed-teeth in a horizontal bearing provided adjacent to the feed-teeth and supported therewith, a fixed guide-block provided with vertical grooves, a transverse bar moving vertically in said grooves and supporting the blade in vertical movement with the feed-teeth, a coöperating shear edge opposed to the blade to cut interfed material, in combination, substantially as set forth.

5. In a sewing-machine, a feed-arm provided with sectional feed-teeth, a pointed cutting-blade horizontally slidingly mounted between the sections of the feed-teeth, a horizontal groove provided in the feed-arm adjacent to the feed-teeth therefor, vertical grooves provided on the fixed portions of the machine wherein portions of the cutting-blade support move vertically and by which arrangement of parts the blade receives the vertical movement of the feed-teeth and is held against the horizontal movement of the same, a presser-foot bearing downward-extended ridges on each side of the blade and between the same and the sections of the feed-teeth and grooved to permit free passage of material to and from the feed-teeth and the blade, a throat-plate provided with an angular strip opposed to the cutting edge of the blade and coöperating therewith to sever interfed material and provided with a ridge adjacent to the blade whereby one of the severed portions is diverted from the sewing mechanism, in combination, substantially as described.

6. In a sewing-machine, a feed mechanism, a piercing cutting-blade mounted in vertical grooves on the fixed portions of the machine and carried therein by the feed mechanism, a shear-strip opposed to the blade, feed-teeth on each side of the blade, a presser-foot ridged and grooved to coöperate with the teeth to feed the work between the presser-foot and the throat-plate to the blade, a throat-plate a curved ridge on the throat-plate adapted to divert one of the severed portions of the work from the stitching mechanism, in combination, substantially as set forth.

7. In a sewing-machine, a feed-operating mechanism, sectional feed-teeth, a throat-plate provided with an elevated curved strip, a presser-foot provided with downward ridges on each side of the blade and between the sections of feed-teeth, a blade having a piercing end and cutting edge operating between the sections of the feed-teeth, the throat-plate and the feed-teeth and the presser-foot being adapted by said conformation and arrangement to feed material to the blade and feed parts thereof to the stitching mechanism and to divert other parts therefrom, a shear edge opposed to the cutting edge of the blade, operative connections with the moving parts of the machine whereby as the work is fed to the feed-teeth it is forced onto the point of the blade and portions of it are fed between the blade and the opposed shear edge, in combination, substantially as set forth.

8. In a sewing-machine, in combination, a stitch-forming mechanism, a throat-plate, feeding mechanism, a presser-foot, and a trimming mechanism located beneath the throat-plate and comprising a blade projecting above said throat-plate, having a horizontally-projecting piercing-point and a cutting edge extending across the plane of the throat-plate and a member coöperating with said blade to shear the fabric, substantially as set forth.

9. In a sewing-machine, an overstitching mechanism, a cutting-blade having a point projecting horizontally above the throat-plate and a cutting edge operating across the plane of said plate and in advance of the stitching mechanism and between sections of the feed-teeth, a shear edge opposed to the blade, feed-teeth arranged in sections, means for operating the same, and a curved ridge on the throat-plate extending from the rear of the cutting edge of the blade rearwardly to one side of the overstitching mechanism, in combination, substantially as shown.

10. In a sewing-machine, a blade provided with a piercing-point and a cutting edge whereby material fed thereto in a folded condition is pierced at the edge of the fold and portions thereof are cut by contact of the blade with a shear-strip opposed thereto, a shear-strip opposed to the blade and coacting therewith, the said blade and shear-strip being disposed in front of the sewing mechanism and said blade operating through the plane of the throat-plate and between separate portions of the feed-teeth, a presser-foot grooved longitudinally in front of and above the blade whereby freedom is given the blade in separating the plies, in combination with a sectional feed and the stitch mechanism of a sewing-machine, substantially as described.

11. In a sewing-machine provided with feeding mechanism, a vertically-moving cutting-blade projecting horizontally above the throat-plate and provided with a point on the level of the fold of material fed thereto in plies and adapted to pierce such fold and separate the plies, a shear edge opposed to and coöperating with said blade, the said cutting members being disposed in front of the stitching mechanism, stitching mechanism and means for diverting therefrom one of the edges cut by the blade, in combination, substantially as shown.

12. In a sewing-machine, a blade provided with a piercing-point and a cutting edge located between portions of the feed-teeth, a presser-foot provided with downwardly-extending ridges for pressing the work between the blade and the sections of the feed-teeth and an intermediate groove to permit free entry of the blade between plies of the fabric and the passage of the work, a throat-plate provided with a ridge extending from behind the blade and curving therefrom to a point behind the stitching mechanism whereby certain of the plies adjacent to the throat-plate are diverted between the presser-foot and the throat-plate from such mechanism, in combination with operative parts of a sewing-machine for feeding and stitching material fed thereto, substantially as shown.

13. In a sewing-machine, a throat-plate provided with an elevated ridge extending from a point in front and at one side of the needle to the other side and rearward of the needle and diverting severed parts of the material below the presser-foot, a cutting-blade provided with a horizontally-projected sharpened point and a cutting edge, an opposed severing member, in combination with operative parts of a sewing-machine for feeding and stitching material fed thereto, substantially as shown.

14. In an overstitching sewing-machine provided with needles, a throat-plate with an elevated ridge extending from a point between the needles and in front thereof to a point to the rear and at one side of the same whereby certain folds separated and cut by the blade may be diverted while drawn between the presser-foot and the feed-teeth, a piercing and cutting blade operating between the needles through the plane of the throat-plate and adjacent to the forward end of the ridge, feed-teeth disposed partly on one side and partly on the other side of the ridge and blade, a presser-foot provided with downwardly-extended elevations for pressing the work between the feed-teeth and the blade and recessed to give space between the plies for the operation of the blade, in combination with coöperative parts of a sewing-machine for feeding and stitching material, substantially as shown.

15. In a sewing-machine, overstitching mechanism, a pointed horizontally-projecting vertically-moving cutting-blade in front of the stitching mechanism and operating to cut material fed between the cutting-blade and the throat-plate, and a ridge engaging one of such cut edges and diverting the same from the stitching mechanism, and a feeding mechanism, in combination, substantially as shown.

16. In a sewing-machine, overstitching mechanism, feeding mechanism, a cutting mechanism located in advance of the stitching mechanism and comprising a pointed blade mounted in operative connection with the feeding mechanism to receive the vertical movement of the feed-teeth, means for preventing horizontal movement of the blade with the feed-teeth, and a ridge extending rearwardly from the side of the cutting mechanism to one side of the stitching mechanism, in combination, substantially as shown.

17. In a sewing-machine provided with overstitching mechanism, feeding mechanism, a throat-plate, a presser-foot and a cutting mechanism in front of the stitching mechanism, a curved ridge on the throat-plate extending rearwardly from the rear of the cutting mechanism and at one side thereof to one side of the stitching mechanism, substantially as set forth.

18. In a sewing-machine, overstitching mechanism, a feeding mechanism, a piercing, cutting and separating blade carried by the feeding mechanism to have the vertical movement of the feed-teeth, and means provided to restrict the blade from horizontal movement, the said blade having a forwardly-projecting point and a cutting edge, a shear edge opposed to the blade, and means for guiding one of the severed edges from the stitching mechanism, in combination, substantially as shown.

19. In a sewing-machine provided with stitching mechanism, a throat-plate, feeding mechanism comprised of feed-teeth arranged in sections and a cutting mechanism comprising a blade extending up through the throat-plate from beneath the same with a horizontally-projecting point above the throat-plate and extending therefrom with a cutting edge across the plane of the plate, the combination of a presser-foot provided with downward ridges between the cutting mechanism and the adjacent teeth-sections and grooved above the cutting mechanism, substantially as shown.

20. In a sewing-machine, feeding mechanism provided with feed-teeth, a forwardly-projecting piercing and cutting blade in juxtaposition to the feed-teeth, sewing mechanism in juxtaposition to the blade, the said blade operating independently of the horizontal movement of the feeding mechanism but receiving vertical movement from the feeding mechanism, in combination, substantially as described.

21. In a sewing-machine provided with stitching mechanism, a throat-plate, feeding mechanism comprised of feed-teeth arranged in sections, cutting mechanism comprising a blade pointing forwardly above the throat-plate and extending therefrom with a cutting edge across the plane of the plate and a diverting-ridge on the throat-plate extending from the side of the cutting mechanism rearwardly to one side of the stitching mechanism, the combination of a presser-foot provided with a ridge between the cutting mechanism and the adjacent feed-teeth on the one side and between the cutting mechanism and the adjacent feed-teeth and in front of the diverting-strip on the other side, and grooved to permit free movement of the cutting-blade, substantially as shown.

22. In a sewing-machine, the combination of overstitching mechanism, means for feeding a plurality of thicknesses of material, cutting means comprising a device for piercing the fold of the material and separating the thicknesses as the cutting is performed whereby only one of said thicknesses is cut, and means for guiding the free severed edge away from the stitching mechanism before it reaches the same, the said stitching mechanism being located behind the cutting mechanism and arranged to sew one of the cut edges to the uncut fabric by covering the cut edge, substantially as described.

23. In a sewing-machine, the combination of overstitching mechanism, means for feeding a plurality of thicknesses of material, cutting mechanism comprising a device for piercing the fold of material and separating the thicknesses as the cutting is performed whereby certain of said thicknesses are cut, a presser-foot ridged and grooved to coöperate with the feeding and cutting mechanisms and means for guiding the free severed edge away from the stitching mechanism before it reaches the same, substantially as shown.

24. In a sewing-machine, a stitching mechanism, mechanism for feeding material thereto, a horizontally-extended blade provided with a piercing-point mounted adjacent to the feed-teeth and carried vertically therewith, connection between the cutting member and fixed parts of the machine whereby the cutting member is held against the horizontal movement of the feeding mechanism, in combination, substantially as described.

25. In a sewing-machine provided with a throat-plate, the combination with stitching and feeding mechanisms of a cutting mechanism comprising a device for piercing the edge of folded material and separating the thicknesses of the same consisting of a blade with a horizontally-projecting point above the throat-plate and a cutting edge extended across the plane of the plate, substantially as shown.

26. In a sewing-machine, the combination of a stitching mechanism, a cutting mechanism, a feeding mechanism and a presser-foot, the feeding mechanism and the presser-foot being constructed and arranged to force the folded edge of material onto the point of the cutting mechanism which latter comprises a blade with a point for piercing such fold the said feeding mechanism extending forwardly of the cutting mechanism, substantially as described.

27. In a sewing-machine and in combination with the stitching mechanism thereof, mechanism for feeding a folded fabric, trimming mechanism comprising a blade with a piercing-point projecting horizontally to pierce the fold and separate the plies, and a member coöperating with said blade to shear the lower ply, substantially as described.

28. In a sewing-machine and in combination with the stitching mechanism thereof, feeding mechanism provided with feed-teeth, a forwardly-projecting cutting-blade in juxtaposition to said feed-teeth, said blade operating independently of the horizontal movement of the feeding mechanism but receiving vertical movement therefrom, substantially as described.

29. In a sewing-machine and in combination with the stitching mechanism thereof, feeding mechanism provided with feed-teeth, a cutting-blade mounted adjacent to said feed-teeth and carried vertically therewith, a connection between the cutting member and a fixed part of the machine whereby said cutting member is held against horizontal movement of the feeding mechanism, substantially as described.

In testimony whereof we affix our signatures in presence of two witnesses.

BERNARD H. ZIMMERMAN.
ROBERT HUGHES, Jr.

Witnesses:
ELEANOR T. DE GIORGI,
W. G. STONE.